United States Patent Office 2,719,839
Patented Oct. 4, 1955

2,719,839

ANTHRAQUINONE AZOLES WHICH CARRY IN THE MOLECULE AN AZOBIPHENYL RADICAL

Joseph Deinet, Glassboro, N. J., assignor to E. I du Pont de Nemours and Company, Wilmington, Del., a corporation of Delaware No Drawing. Application July 9, 1951,
Serial No. 235,893

6 Claims. (Cl. 260—157)

This invention relates to new compounds of the anthraquinone azole series which are more particularly mono-sulfo compounds of anthraquinone oxazoles and thiazoles containing in the molecule an azobiphenyl radical. These new compounds are valuable as vat dyes and more particularly as intermediates for the preparation of new vat dyes. These anthraquinone azole compounds have the general formula:

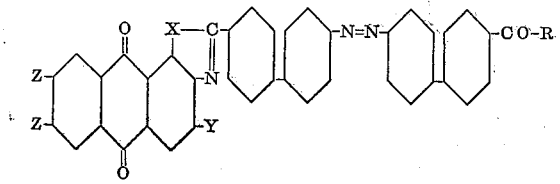

in which X stands for one of the elements of the group consisting of O and S; Y stands for a substituent of the group consisting of —H, —halogen (more particularly chlorine and bromine) and —SO₃M where M stands for —H and an alkali metal more particularly Na and K; R stands for a substituent of the group consisting of —Cl, —OH, —NH₂ and —O—alkyl in which the alkyl group contains from 1 to 18 carbon atoms; and wherein one of the positions Z and Y carries the group —SO₃M where M has the same significance as above.

In U. S. Patent 2,559,668 a series of anthraquinone oxazole and thiazole compounds which carry an azobiphenyl grouping is disclosed which are valuable as dyes, pigments and intermediates for the preparation of other dyes, more particularly new and valuable yellow dyes of the anthraquinone series which dye cellulose fibers from the usual alkaline hydrosulfite vats in strong shades having outstanding fastness properties. The simple monooxazole and mono-thiazole compounds of that series exhibited unexpected light fastness as pigments and vat dyes, and, while they did not exhibit the high tinctorial strength of other dyes made from them as intermediates, they exhibited sufficient tinctorial strength to make them valuable as vat dyes.

In U. S. Patent 2,559,669 a series of dyes is disclosed which are produced from the products of U. S. Patent 2,559,668 above mentioned. While these dyes exhibited outstanding brightness, tinctorial strength and fastness properties when applied to textile materials by the usual dyeing processes, it was found that when applied by the usual printing processes they did not exhibit the same strong and bright shades.

It is an object of the present invention to produce new compounds which are useful as vat dyes but which are of particular value as intermediates for the preparation of other anthraquinone vat dyes which dye textile fibers from the usual alkaline hydrosulfite vats, or by the usual printing processes, of good tinctorial strength, exhibiting good brightness and fastness properties. It is a further object of this invention to produce new and valuable anthraquinone-oxazole and anthraquinone-thiazole compounds carrying the azobiphenyl nucleus, which are particularly useful as intermediates in the preparation of vat dyes, from readily available aminoanthraquinone sulfonic acids and from halogenaminoanthraquinone sulfonic acids, and which carry in the anthraquinone nucleus in one of the beta positions a sulfonic acid group either in the form of the free acid or its alkali metal salt.

The anthraquinone-oxazole compounds of the present invention may be prepared by condensing a 1-halogen-2-amino-anthraquinone-beta-sulfonic acid (preferably an alkali metal salt) with 4,4'-azobiphenyl-4'',4'''-dicarboxylic acid chloride in substantially equal molecular amounts in a non-reactive organic medium at temperatures of from 120° to 210° C. The resulting compounds, in which only one of the acid chloride groups has been substituted by the aminoanthraquinone compound and which therefore carries a free carboxylic acid chloride group, may be readily converted to the free carboxylic acid, ester or amide compounds with subsequent ring closure of the 1-halogen-2-aminocarbonyl grouping to the oxazole. The free carboxylic acid of the oxazole may then be converted to the acid chloride by means of thionyl chloride.

The thiazole acid chloride compounds of the above formula are readily obtained by condensing a 1-mercapto-2-aminoanthraquinone-beta-sulfonic acid with azobiphenyldicarboxylic acid chloride, using substantially equal molecular amounts, the condensation being carried out in a non-reactive organic medium. The thiazole and the oxazole compounds carrying the free acid chloride group may then be further condensed to the vat dyes more particularly disclosed in co-pending application Serial No. 235,891 filed of even date herewith.

The new compounds of this invention are in general yellow in color and when vatted dye and print cellulose fibers in yellow shades. On vatting with alkaline sodium hydrosulfite the compound containing the free carboxylic acid chloride group, it is converted to the sodium salt of the free acid and therefore dyes and prints in the same manner as the alkali metal salt of the free acid derivative itself. These compounds are water insoluble, and therefore are applied by the usual alkaline hydrosulfite procedure to cellulose fibers.

The following examples are given to illustrate the invention. The parts used are by weight.

Example 1

Five hundred (500) parts of nitrobenzene, 1 part of pyridine, 20.2 parts of 1-bromo-2-aminoanthraquinone-3-sulfonic acid sodium salt (fine powder) and 23 parts of 4,4'-azobiphenyl-4'',4'''-dicarboxylic acid chloride are heated together to 160° C. while agitating and maintained at this temperature for three hours. The mass is then cooled to 50° C. and 10 parts of water added, heated to 120°–125° C. and maintained at this temperature for six hours. The mass is then cooled to 50° C. and 20 parts of sodium carbonate, 20 parts of potassium acetate, 1 part of cupric acetate and 1 part of cuprous chloride are added and the mass heated to 210° C. and maintained at this temperature for three hours. The mass is then cooled to 50° C. and filtered. The filter cake is washed with nitrobenzene, alcohol and hot water in turn, and dried. It forms a dark yellow powder, which product dyes cotton from a sodium hydrosulfite vat in yellow shades.

The product in the form of the sodium salt has the following formula:

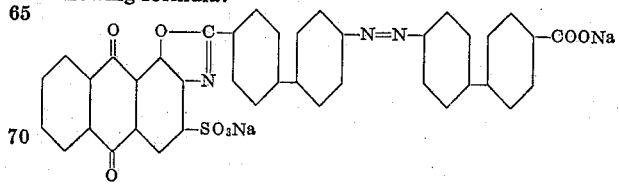

Example 2

Five hundred (500) parts of nitrobenzene, 1 part of pyridine, 20.2 parts of 1-bromo-2-aminoanthraquinone-3-sulfonic acid sodium salt (fine powder) and 23 parts of 4,4'-azobiphenyl-4'',4'''-dicarboxylic acid chloride are heated together to 160° C. and maintained at this temperature for three hours. The mass is then cooled to 100° C. and a slow stream of ammonia is passed into the reaction mass by good agitation for one and one-half hours; then are added 20 parts of sodium carbonate, 20 parts of potassium acetate, 1 part of cupric acetate and 1 part of cuprous chloride, and the mass is heated to 210° C. and maintained at this temperature for three hours. The mass is then cooled to 50° C. and filtered. The filter cake is washed with nitrobenzene, alcohol and hot water, in turn. The product forms a yellow paste and dyes and prints cotton in yellow shades. In the form of the sodium salt it has the following formula:

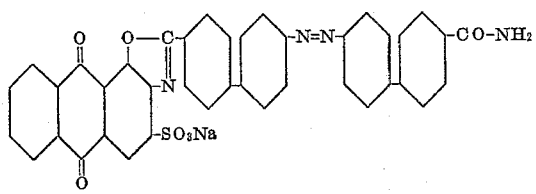

Example 3

Five hundred (500) parts of nitrobenzene, 1 part of pyridine, 20.2 parts of 1-bromo-2-aminoanthraquinone-3-sulfonic acid sodium salt (fine powder) and 23 parts of 4,4'-azobiphenyl-4'',4'''-dicarboxylic acid chloride are heated together to 160° C. and maintained at this temperature for three hours. The mass is then cooled to 25° C. and 15 parts of methyl alcohol are added, heated to 120° C. and maintained at this temperature for six hours. The mass is then cooled to 50° C. and 20 parts of sodium carbonate, 20 parts of potassium acetate, 1 part of cupric acetate and 1 part of cuprous chloride are added and the mass heated to 210° C. and maintained at this temperature for three hours. The mass is then cooled to 40° C. and filtered. The filter cake is washed with nitrobenzene, alcohol and hot water in turn, and dried. The product froms a yellow powder and dyes cotton from a sodium hydrosulfite vat in yellow shades. In the form of the sodium salt it has the following formula:

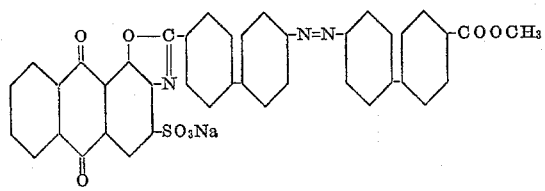

Example 4

Eight hundred (800) parts of nitrobenzene, 1 part of pyridine, 57 parts of 4,4'-azobiphenyl-4'',4'''-dicarboxylic acid chloride and 70 parts of 1-mercapto(Na)-2-aminoanthraquinone-3-sulfonic acid sodium salt are slowly heated together to 200° C. and maintained for one-half hour. The mass is then cooled to 40° C. and filtered. The filter cake is washed with carbon tetrachloride and dried. The thiazole acid chloride of the following formula is obtained:

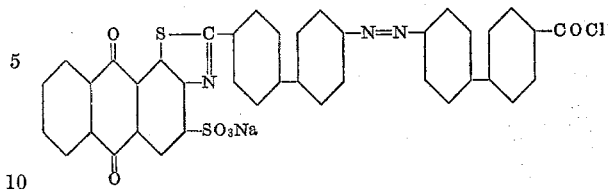

The above formulated compound as a dry powder is then slurried in 1000 parts of cold water, filtered to remove dissolved NaCl and washed nearly acid-free and dried. The dry powder is then dissolved in 450 parts of 96% sulfuric acid at the temperature of 25° C. The mass is then poured into 3000 parts of cold water and filtered. The filter cake is then washed acid-free and made up to a fine paste. The product dyes and prints cotton in yellow shades. In the form of the free acid, it has the following formula:

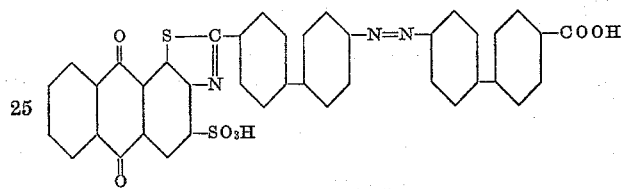

Example 5

Eleven hundred (1100) parts of nitrobenzene, 2 parts of pyridine, 42.2 parts of 4,4'-azobiphenyl-4'',4'''-dicarboxylic acid and 40 parts of thionyl chloride are heated together to 100° C. and maintained for fifteen hours. The mass is then air blown for one hour to remove excess of thionyl chloride, and cooled to 50° C. 48.3 parts of 1,3-dibromo-2-aminoanthraquinone-6-sulfonic acid (Na salt) fine powder are added and the mass heated to 208° C. and maintained at this temperature for one and one-half hours. The reaction mass is then cooled to 40° C., filtered, and the filter cake washed with carbon tetrachloride and dried. The resulting compound in the form of the free acid, has the following formula:

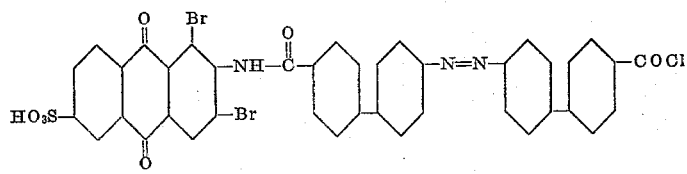

Five hundred (500) parts of nitrobenzene, 50 parts of above acid chloride and 10 parts of water are heated together to 120°–125° C. and maintained for six hours. The mass is then cooled to 100° C. and 25 parts of sodium carbonate, 25 parts of potassium acetate, 0.5 part of cupric acetate and 0.5 part of cuprous chloride are added and the mass heated to 210° C. and maintained for three hours. The mass is then cooled to 50° C. and filtered. The filter cake is washed with alcohol and water, in turn, and dried. The final product forms a yellow powder and dyes cotton from a sodium hydrosulfite vat in yellow shades. The product in the form of the sodium salt has the following formula:

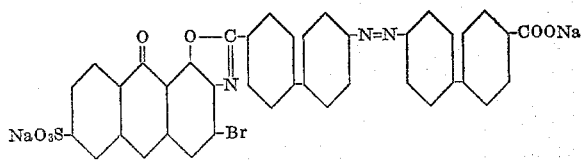

As illustrated in the above examples, the new compounds of this invention may be isolated in the form of the free acid or the alkali metal salts. On vatting by the usual procedure with an alkali metal hydrosulfite and caustic they will of course be converted to the alkali metal salt and are found on the textile fibers in that form. The compounds of the present invention which contain the anthraquinone-oxazole or the anthraquinone-thiazole group exhibit good dyeing and printing properties even though they carry an unsubstituted acid group in the form of the alkali metal salt or in the form of the acid amide or ester.

The alkyl esters of either the anthraquinone-oxazole or the anthraquinone thiazole compounds may be readily produced as exemplified in Example 3, and any alcohol containing from 1 to 18 carbon atoms may be substituted for the methyl alcohol of that example, such as ethyl, butyl, hexyl, octyl, dodecyl, etc.

Any inert organic solvent having suitable boiling point may be used as a medium in which the condensation of the aminoanthraquinone sulfonic acid and the azobiphenyldicarbonyl chloride may be carried out, such as nitrobenzene, halogenated nitrobenzene, nitrotoluene, naphthalene, the chlorobenzenes, etc.

As illustrated in my co-pending application Serial No. 235,892, filed of even date herewith, the condensation of the aminoanthraquinone sulfonic acid and the azobiphenylcarbonyl chloride are preferably carried out in the presence of pyridine or other organic compound such as quinoline, dimethyl aniline, etc., although these condensation assistants may be entirely omitted, if desired.

The free carboxylic acids or the alkali metal salts of the free carboxylic acids of the compounds of this invention may be reconverted to the carboxylic acid chloride by treatment with thionyl chloride, as more particularly disclosed in Example 2 of U. S. Patent 2,559,668, above mentioned. The acid chlorides, amides, and the ester derivatives of the compounds of this invention, irrespective of whether they are oxazoles or thiazoles, may be carried out in the manner illustrated for particular compounds in the specific examples above given.

The compounds of this invention are characterized by the presence of a sulfonic acid group (either as a free acid or as the alkali metal salt) in one of the beta positions of the anthraquinone radical. The presence of this single sulfonic acid group imparts to the compound improved application properties both as to the compounds themselves when used as dyes, or in the ultimate dyestuffs produced therefrom, as more particularly disclosed in co-pending application Serial No. 235,891, filed of even date herewith.

The 1,3-dibromo-2-aminoanthraquinone of Example 5 may be substituted by any of the known 1,3-dihalogen-2-aminoanthraquinone compounds which carry the sulfonic acid group in one of the positions 6 and 7. In place of the 1,3-dihalogen-2-amino-6-anthraquinone sulfonic acid or other halogenaminoanthraquinone-6-sulfonic acid used as a starting material in the preparation of the compounds of this application, the normally occuring mixture of the 6- and 7-anthraquinone-mono-sulfonic acids may be employed.

I claim:

1. The water insoluble anthraquinone azole compounds of the general formula:

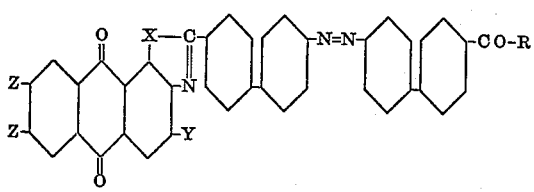

in which X stands for an element of the group consisting of O and S; Y stands for a member of the group consisting of —H, —Cl, —Br, —SO$_3$H, —SO$_3$Na and SO$_3$K; R stands for a substituent of the group consisting of —Cl, —OH, —NH$_2$ and —O-alkyl in which the alkyl group contains from 1 to 18 carbon atoms; Z stands for a member of the group consisting of —H, —SO$_3$H, —SO$_3$Na and —SO$_3$K; one of the positions Y and Z carrying a substituent of the group —SO$_3$H, —SO$_3$Na and —SO$_3$K but there being not more than one of such groups attached to the anthraquinone nucleus.

2. The water insoluble anthraquinone azole compound which in the form of the sodium salt has the formula:

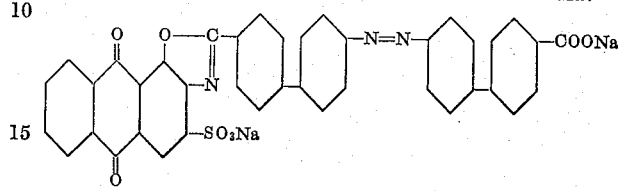

3. The water insoluble anthraquinone azole compound which in the form of the sodium salt has the formula:

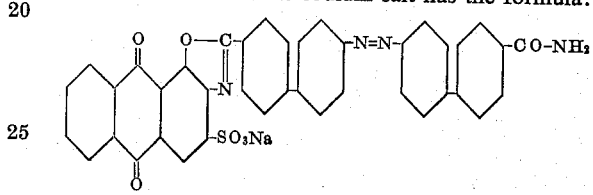

4. The water insoluble anthraquinone azole compound which in the form of the sodium salt has the formula:

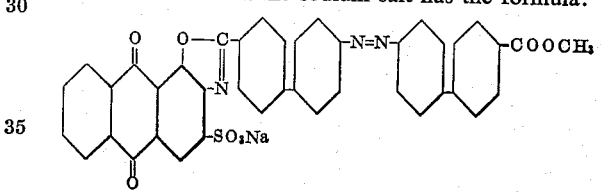

5. The water insoluble anthraquinone thiazole compound which in the form of the sodium salt has the formula:

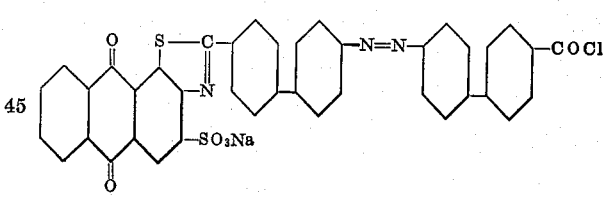

6. The water insoluble anthraquinone oxazole compound which in the form of the sodium salt has the formula:

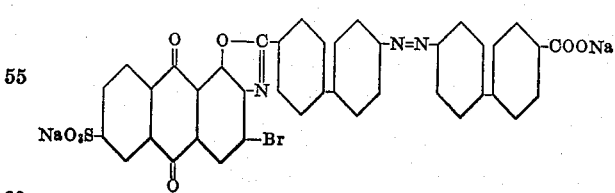

References Cited in the file of this patent

UNITED STATES PATENTS

| | | |
|---|---|---|
| 2,108,126 | Honold et al. | Feb. 15, 1938 |
| 2,145,954 | Semple et al. | Feb. 7, 1939 |
| 2,395,229 | Lowe et al. | Feb. 19, 1946 |
| 2,559,668 | Schroeder et al. | July 10, 1951 |
| 2,559,669 | Schroeder et al. | July 10, 1951 |

OTHER REFERENCES

Georgievics et al., "Dye Chemistry," 1920, pages 6 and 7.